United States Patent
Daniel et al.

(10) Patent No.: US 12,025,720 B2
(45) Date of Patent: Jul. 2, 2024

(54) LOCALIZATION OF AN ACOUSTIC SOURCE

(71) Applicant: ORANGE, Issy-les-Moulineaux (FR)

(72) Inventors: Jérome Daniel, Chatillon (FR); Srdan Kitic, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 255 days.

(21) Appl. No.: 17/769,540

(22) PCT Filed: Oct. 5, 2020

(86) PCT No.: PCT/FR2020/051742
§ 371 (c)(1),
(2) Date: Apr. 15, 2022

(87) PCT Pub. No.: WO2021/074502
PCT Pub. Date: Apr. 22, 2021

(65) Prior Publication Data
US 2023/0026881 A1    Jan. 26, 2023

(30) Foreign Application Priority Data

Oct. 18, 2019 (FR) ...................................... 1911723

(51) Int. Cl.
*G01S 3/802* (2006.01)
*H04R 1/32* (2006.01)

(52) U.S. Cl.
CPC ............ *G01S 3/8027* (2013.01); *H04R 1/326* (2013.01); *H04R 2430/20* (2013.01)

(58) Field of Classification Search
CPC ......... G01S 3/8027; G01S 5/28; H04R 1/326; H04R 2430/20; H04R 2201/401; H04R 1/406; H04R 3/005
See application file for complete search history.

(56) References Cited

U.S. PATENT DOCUMENTS

| | | | |
|---|---|---|---|
| 2011/0317522 A1 | 12/2011 | Florencio et al. | |
| 2023/0026881 A1* | 1/2023 | Daniel | H04R 1/326 |
| 2024/0012093 A1* | 1/2024 | Daniel | G01S 11/14 |

FOREIGN PATENT DOCUMENTS

| | | | | |
|---|---|---|---|---|
| FR | 3102325 A1 * | 4/2021 | ........... | G01S 3/8027 |
| FR | 3116348 A1 * | 5/2022 | ............. | G01S 11/14 |

(Continued)

OTHER PUBLICATIONS

English translation of the Written Opinion of the International Searching Authority dated Jan. 19, 2021 for corresponding International Application No. PCT/FR2020/051742, filed Oct. 5, 2020.

(Continued)

*Primary Examiner* — Daniel Pihulic
(74) *Attorney, Agent, or Firm* — David D. Brush; Westman, Champlin & Koehler, P.A.

(57) ABSTRACT

Processing sound signals acquired by a microphone, for example an ambisonic type, to locate a sound source in a space including at least one wall. A time-frequency transform is applied to the acquired signals, and, from the acquired signals, a velocity vector, complex with real and imaginary parts, is expressed in the frequency domain, wherein the velocity vector characterizes a composition between: a first acoustic path, direct between the source and the microphone, represented by a first vector; and a second acoustic path resulting from a reflection on the wall and represented by a second vector. The second path has a first delay with respect to the direct path. Depending on the first delay and the first and second vectors, a parameter is determined from among a direction of the direct path, a distance from the source to the microphone, and a distance from the source to said wall.

15 Claims, 5 Drawing Sheets

(56) References Cited

FOREIGN PATENT DOCUMENTS

| FR | 3132960 A1 | * | 8/2023 | |
|----|------------|---|--------|---|
| WO | WO-2021074502 A1 | * | 4/2021 | ........... G01S 3/8027 |
| WO | WO-2022106765 A1 | * | 5/2022 | .............. G01S 11/14 |
| WO | WO-2023156316 A1 | * | 8/2023 | |

OTHER PUBLICATIONS

International Search Report dated Jan. 11, 2021 for corresponding International Application No. PCT/FR2020/051742, Oct. 5, 2020.
Written Opinion of the International Searching Authority dated Jan. 11, 2021 for corresponding International Application No. PCT/FR2020/051742, filed Oct. 5, 2020.
Paulo Felisberto et al., "Experimental Results of Underwater Cooperative Source Localization Using a Single Acoustic Vector Sensor", Sensors, vol. 13, No. 7, Jul. 12, 2013 (Jul. 12, 2013), pp. 8856-8878, XP055701417.
Tervo Sakari, "Direction estimation based on sound intensity vectors", Aug. 24, 2009 (Aug. 24, 2009), pp. 700-704, XP032759032.
Wu Kai et al, "Multi-source direction-of-arrival estimation in a reverberant environment using single acoustic vector sensor", 2015 IEEE International Conference on Acoustics, Speech and Signal Processing (ICASSP), IEEE, Apr. 19, 2015 (Apr. 19, 2015), pp. XP033186801.

* cited by examiner

LOCALIZATION OF AN ACOUSTIC SOURCE

CROSS-REFERENCE TO RELATED APPLICATIONS

This Application is a Section 371 National Stage Application of International Application No. PCT/FR2020/051742, filed Oct. 5, 2020, which is incorporated by reference in its entirety and published as WO 2021/074502 A1 on Apr. 22, 2021, not in English.

FIELD OF THE DISCLOSURE

The present invention relates to the field of acoustic source localization, in particular for the estimate of acoustic direction or "DoA" (Direction of Arrival) by a compact microphone system (for example a microphone capable of picking up sounds in "ambiophonic" representation or "ambisonic" hereinafter).

A possible application is for example the formation of channels or ("beamforming", which then goes through a spatial separation of audio sources, in order in particular to improve speech recognition (for example for a virtual assistant by voice interaction). Such processing can also be used in 3D audio coding (pre-analysis of a sound scene to code the main signals individually), or even allow spatial editing of immersive sound content, possibly in an audio-visual manner (for artistic, radiophonic, cinema, etc. purposes). It also allows monitoring a speaker in a teleconference or the detection of sound events (with or without associated video).

BACKGROUND OF THE DISCLOSURE

In the state of the art relating to ambisonic type encodings (or equivalent), most of the approaches are based on the spatial components resulting from a frequency analysis (a time-frequency representation typically resulting from a processing by short-term Fourier transform or "STFT", or a representation of narrow-band temporal signals resulting from a bank of filters).

Ambisonic signals at order 1 are gathered in vector form according to the equation Eq. 1 given in the APPENDIX hereinafter. The encoding convention of Eq. 1 is presented here for convenience but without restriction since conversions with other conventions can be implemented just as well. Thus, when the field is comparable to a single plane wave coming from a direction described by the unit vector U1 (therefore the direction DoA of the source) and carrying the emitted signal s1(t), it can be written according to the equation Eq. 2 (APPENDIX).

In practice, the signals are analyzed in the frequency domain, frame after frame (in French: "trame"), which gives the expression Eq. 3 (APPENDIX), and for the case of a single wave in the form Eq. 4, and by extension for N waves in the form Eq. 5.

One category of methods relies on the analysis of the velocity vector V(f) or of the intensity vector I(f) (the first one being an alternative version of the second one, normalized by the power of the omnidirectional reference component), as expressed in Eq. 6 and Eq. 7.

The methods that exploit complex frequency samples essentially base the localization estimation on the information contained in the real part of such vectors (linked to the characteristic and active intensity of the wave propagation in that it is directly linked to the phase field gradient).

The imaginary part (reactive part associated with the energy gradient) is on the other hand considered characteristic of stationary acoustic phenomena.

It is indeed visible that within the framework of a single plane wave, the velocity vector can be summarized as $V=U1$.

The known method (called "DirAC") operates either on temporal samples filtered into sub-bands in which case they are real and the intensity vector also is, or on complex frequency samples in which case it is the real part of the vector intensity which is only exploited as designating the direction of origin (or more precisely, the opposite thereto). In addition, the calculation of a so-called "diffuseness" coefficient, linked to the ratio between the norm of the vector and the energy of the sound field, makes it possible to decide whether the available information at the frequency taken into consideration is rather characteristic of directional components (whereby the vector direction determines the location) or of an "ambience" (field resulting from diffuse reverberation and/or a mixture of undifferentiated secondary sound sources).

Another method denoted hereinafter "VVM" is based on the velocity vector and the statistics of the angular direction of the real part thereof, weighted by certain factors linked to the ratio between real and imaginary parts and their norms. A spherical cartography (2D histogram, for example equirectangular) is established by collecting values on all the frequency samples and on a certain number of temporal frames. The estimate is therefore essentially based on a maximum probability and is subject to a certain latency.

Another category of so-called "covariance" methods, sometimes presented as an extension of the first one, involves the calculation of a covariance matrix of the spatial components (also sometimes called the Power Spectral Density matrix or "PSD") by frequency sub-bands. Here again, the imaginary part is sometimes totally ignored. It should be noted that the first line (or first column) of this matrix is equivalent to the intensity vector when the spatial components are of the ambisonic type. Many of these approaches involve "sub-space" methods and algorithms that are sometimes costly, especially when they work on a large quantity of frequency sub-bands, and when they exploit higher spatial resolutions.

These "vector-based" or "matrix-based" methods attempt to discern the "directional" components associated with localizable acoustic sources or paths, on the one hand, from ambient components, on the other.

Among the observed limitations of such methods, these are hampered by the interference of the direct sound (which indicates the direction of the acoustic source) with the reflections, even in the case of a single simultaneously active acoustic source. Beyond a certain degree of presence of a room effect, for example, they cannot give a reasonable estimate often enough and/or the estimate is too often biased. When the object comprising the capture and acoustic localization device (an ambisonic microphone, for example) is placed for example on a table or near a wall (and/or if this is the case near the acoustic source), such reflective surfaces tend to induce a systematic angular bias.

Indeed, the localization is generally biased by the systematic interference of the direct sound with reflections associated with the same acoustic source. When it is based on the velocity vector, it is the real part of the velocity vector which is mainly taken into consideration, while the imaginary part is usually ignored (or at least underused). Acoustic reflections, considered as disturbing, are not included in the estimation problem. They therefore remain an ignored component, not modeled, without taking into account the particular induced interference structures.

Thus, for applications of the aforementioned type, the acoustic localization is generally estimated in angular terms only. Moreover, no effective approach seems to propose an evaluation of distance from a single capture point (considered as unique for a coincident or more generally "compact" microphone system, i.e., contained in a volume small in size compared to the distances from the acoustic sources, typically around ten centimeters for an ambisonic microphone).

However, some application contexts require additional information, namely the distance from the source, in addition to its direction (and therefore a 3D localization in XYZ). These are for example:
- virtual navigation in real environments captured in 3D (because the appropriate modification of the angle and the intensity of a source depends on the relative XYZ translation between this object and the microphone),
- the localization of sources to identify speaking people (in particular for a connected speaker or similar),
- monitoring, alert devices in domestic or industrial environments, or others.

SUMMARY

The invention improves the situation.

A method for processing sound signals acquired by at least one microphone is proposed,
for the localization of at least one sound source in a space comprising at least one wall, in which:
A time-frequency transform is applied to the acquired signals,
From the acquired signals, a velocity vector $V(f)$, complex with a real part and an imaginary part, is expressed in the frequency domain, wherein the velocity vector characterizes a composition between:
a first acoustic path, direct between the source and the microphone, represented by a first vector U0, and
at least one second acoustic path resulting from a reflection on the wall and represented by a second vector U1,
the second path having, at the microphone, a first delay TAU1, with respect to the direct path,
Depending on the delay TAU1, on the first vector U0 and on the second vector U1, at least one parameter is determined from among:
a direction (DoA) of the direct path,
a distance d0 from the source to the microphone,
a distance z0 from the source to said wall.

Thus, it is proposed to model the interference between the direct wave and at least one indirect wave (resulting from reflection) and exploit the manifestations of this model on the entire velocity vector (on the imaginary part as well as on the real part thereof).

In an embodiment, the sound signals are acquired by an ambisonic type microphone and the velocity vector $V(f)$ in the frequency domain is expressed by ambisonic components of order 1 in a form of the type:

$$V(f)=1/W(f)[X(f),Y(f),Z(f)]^T.$$

The order considered here is 1, which makes it possible to express the components of the velocity vector in a three-dimensional reference space, but other embodiments are possible with in particular a higher ambisonic order.

In one embodiment, the direction of the direct path can be determined by the first vector U0 from an average over a set of frequencies of the real part of the velocity vector $V(f)$ expressed in the frequency domain (Eq. 24 in the APPENDIX presented at the end of this description).

Thus, even the expression of the velocity vector in the frequency domain already makes it possible to give the vector U0.

In a more advanced embodiment, however:
an inverse transform is applied, from frequencies to time, to the velocity vector to express it in the temporal domain $V(t)$,
at least a maximum $V(t)$max in the expression of the velocity vector as a function of time is sought, after a duration of the direct path, and
the first delay TAU1, corresponding to the time giving the maximum $V(t)$max, is deduced therefrom.

In this embodiment:
the second vector U1 can also be estimated as a function of the first vector U0 and as a function of the maximum $V(t)$max, by a relation of the type:

$$U1=U0-2(U0 \cdot V(t)\text{max})V(t)\text{max}/\|V(t)\text{max}\|^2$$

Figure 1:
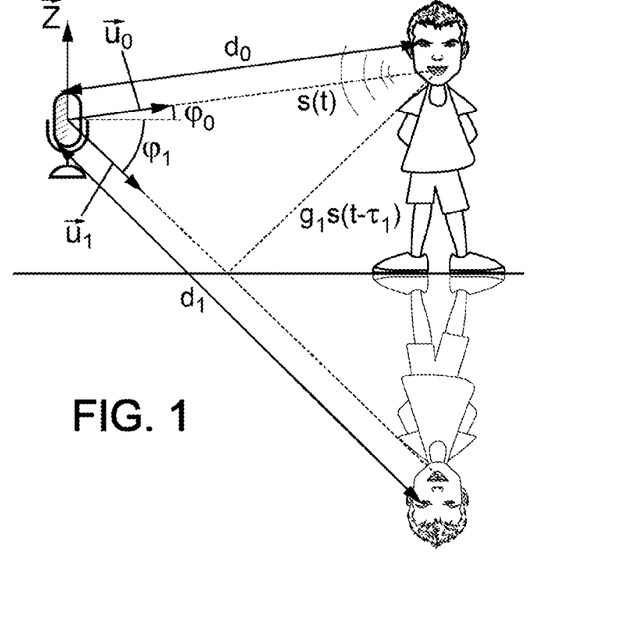
FIG. 1 shows by way of illustration various parameters involved in locating a sound source according to one embodiment.

Then:
respective angles PHI0 and PHI1 of the first vector U0 and of the second vector U1 can be determined, with respect to said wall (FIG. 1), such that:

$$PHI0=\arcsin(U0 \cdot n_R) \text{ and } PHI1=\arcsin(U1 \cdot n_R),$$

where $n_R$ is a unit vector and normal to the wall, and
The distance d0 between the source and the microphone is determined as a function of the first delay TAU1 by a relation of the type:

$$d0=(TAU1 \times C)/((\cos PHI0/\cos PHI1)-1),$$

wherein C is the speed of sound.
In addition, the distance z0 from the source to said wall can be determined by a relation of the type:

$$z0=d0(\sin PHI0-\sin PHI1)/2$$

It is thus possible to determine all the parameters relevant as to the localization of the source (from FIG. 1 for example), here in the case where a single wall is present, although this model can be generalized to the presence of several walls.

Thus in an embodiment where the space includes a plurality of walls:
an inverse transform is applied, from frequencies to time, to the velocity vector to express it in the temporal domain $V(t)$ in the form of a succession of peaks (Eq. 39, FIG. 2),
In the succession of peaks, peaks linked to a reflection on a wall of said plurality of walls are identified, each identified peak having a temporal abscissa as a function of a first delay TAUn of the acoustic path resulting from the reflection on the corresponding wall n, with respect to the direct path,
Depending on each first delay TAUn, on the first vector U0 and on each second vector Un representing an acoustic path resulting from a reflection on a wall n, at least one parameter is determined from among:
the direction (DoA) of the direct path,
the distance d0 from the source to the microphone, and
at least a distance zn from the source to the wall n.

Figure 2:
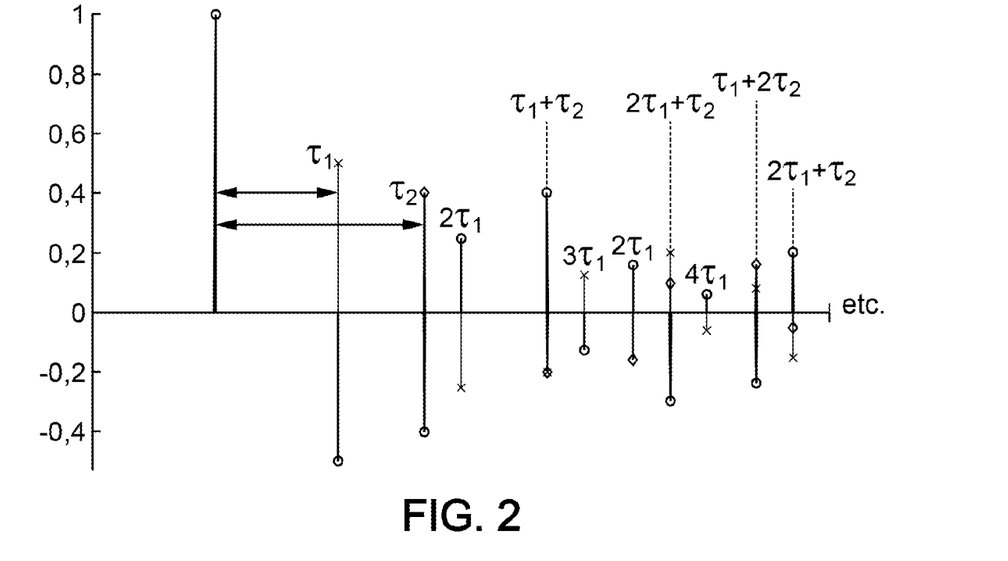
FIG. 2 shows by way of illustration the various successive peaks exhibited by the temporal expression of a velocity vector after its inverse frequency-to-time transform ("IDFT").
Figure 5A:
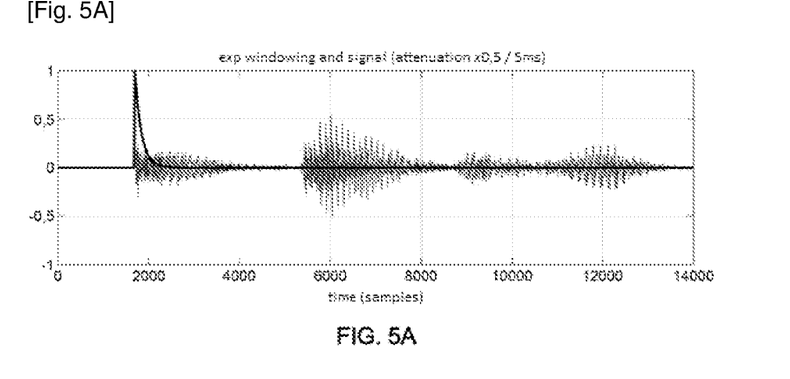
FIG. 5A shows a weighting window of the samples of the acquired signals, exponentially decreasing over time, according to one embodiment.
Figure 5B:
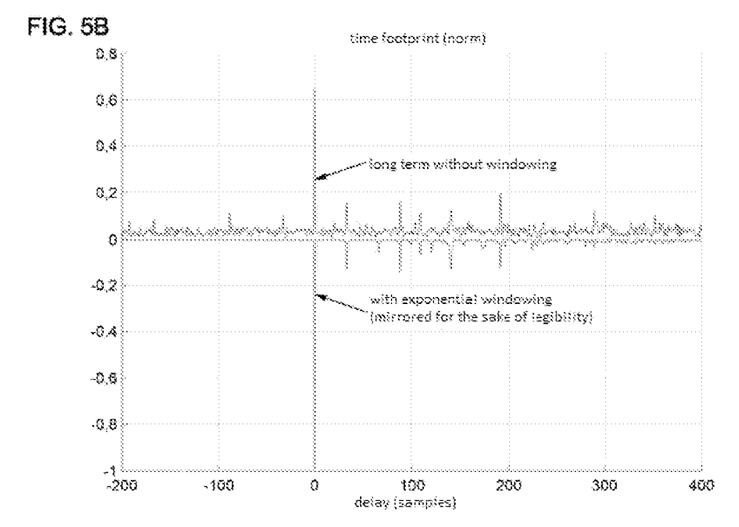
FIG. 5B compares a temporal expression after IDFT of the velocity vector:
  without prior processing of the samples by the weighting window (top curve),
  and with window treatment (bottom curve).

As can be observed in FIG. 5B for example, the expression of the velocity vector after inverse transform (frequencies versus time) presents a succession of peaks, which is also illustrated in FIG. 2 for didactic purposes, where maxima are reached for multiple values of the aforementioned delays (TAU1, 2TAU1, etc.; TAU2, 2TAU2, etc.) between the direct path and the paths resulting from at least one reflection on a wall, as well as for combinations of these delays (TAU1+TAU2, 2TAU1+TAU2, TAU1+2TAU2, etc.).

It is then possible to exploit these peaks to identify in particular the peaks linked at least to a reflection on a wall n and which therefore have multiple temporal abscissas (x1, x2, x3, etc.) of the delay TAUn associated with this wall n.

As the combinations of different delays can complicate the identification of simple delays (TAU1, TAU2, TAU3, etc.) and the presence of associated walls, it is possible to preselect a first part of peaks at the smallest positive temporal abscissas, in order to identify in this part, the peaks each associated with a reflection on a wall (thus without having the combination of different delays TAU1+TAU2, 2TAU1+TAU2, TAU1+2TAU2, etc. which may appear after the first peaks).

In one embodiment, the acquired signals being delivered in the form of successive frames of samples:
  For each frame, it is possible to estimate a score for the presence of a sound onset in the frame, and
  The frames with scores higher than a threshold can be selected for the determination of said at least one parameter.

Indeed, in an approach where the first immediate reflections of the walls are sought, it may be preferable to seek the immediate reaction of the room walls to a sound onset (i.e., the beginning in the emission of a sound, in French: "attaque sonore").

In one embodiment, the signals acquired by the microphone being in the form of a succession of samples, it is possible to apply to said samples a weighting window (in French: "fenêtre de pondération") with decreasing exponential variation over time (FIG. 5A).

Possibly in addition, this window can be placed at the very start of the sound onset (or even just before the onset start). This avoids the discomfort of multiple reflections.

The application of such a weighting window allows a less biased estimation of the parameters U0, d0, etc. derived from the exploitation of the expression of the velocity vector in the temporal domain. Indeed, in certain situations where the cumulative magnitude of the reflections is greater than that of the direct sound, the estimation of the aforementioned parameters may be biased. These situations can be detected when peaks are observed at negative temporal abscissas (curve at the top of FIG. 5B) in the temporal expression of the velocity vector. The application of a weighting window of the aforementioned type makes it possible to bring these peaks back to positive abscissas as illustrated by the curve at the bottom of FIG. 5B, and to give less biased estimates.

In one embodiment, it is also possible to iteratively apply a weighting q(f), each associated with a frequency band f, to the velocity vector V(f) in the frequency domain according to an expression of the (Eq. 49) type:

$$q(f)=\exp(-|Im(V(f))\cdot m|/(\|Im(V(f))\|)),$$

wherein Im(V(f)) is the imaginary part of the velocity vector, complex, and m is a unit vector normal to the plane defined by vector U0 and a normal (z, FIG. 1) to the wall (typically the Z axis of FIG. 1 commented in detail later).

Such an embodiment makes it possible to select the most exploitable frequency bands for the determination of the aforementioned parameters.

The present invention also relates to a device for processing sound signals, comprising a processing circuit for implementing the method according to one of the preceding claims.

Figure 4:
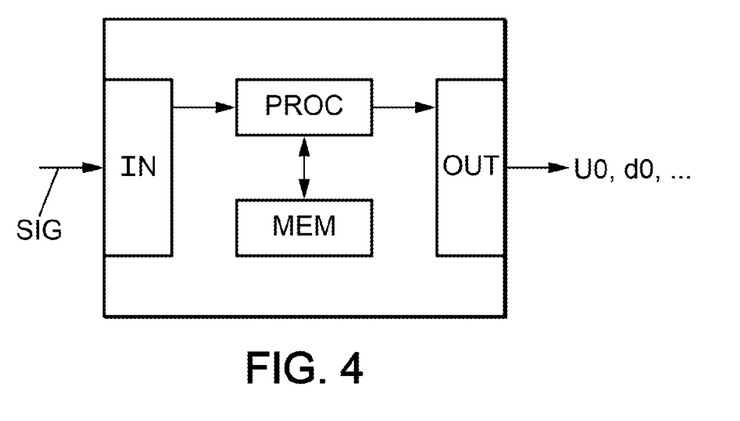
FIG. 4 schematically shows a device within the meaning of the invention according to an embodiment.

By way of illustration, FIG. 4 schematically shows such a processing circuit which can then comprise:

an input interface IN to receive signals SIG acquired by the microphone (which may include several piezoelectric pads to compose these signals, for example in an ambisonic context),
  a processor PROC cooperating with a working memory MEM to process these signals in particular to establish the expression of the velocity vector in order to draw therefrom the desired parameters d0, U0, etc., the values of which can be delivered by the output interface OUT.

Such a device can take the form of a module for locating a sound source in a 3D environment, this module being connected to a microphone (sound antenna type, or other). Conversely, it may be a sound rendering engine based on a given position of a source in a virtual space (comprising one or more walls) in augmented reality.

The present invention also relates to a computer program comprising instructions for implementing the method above, when these instructions are executed by a processor of a processing circuit.

Figure 3A:
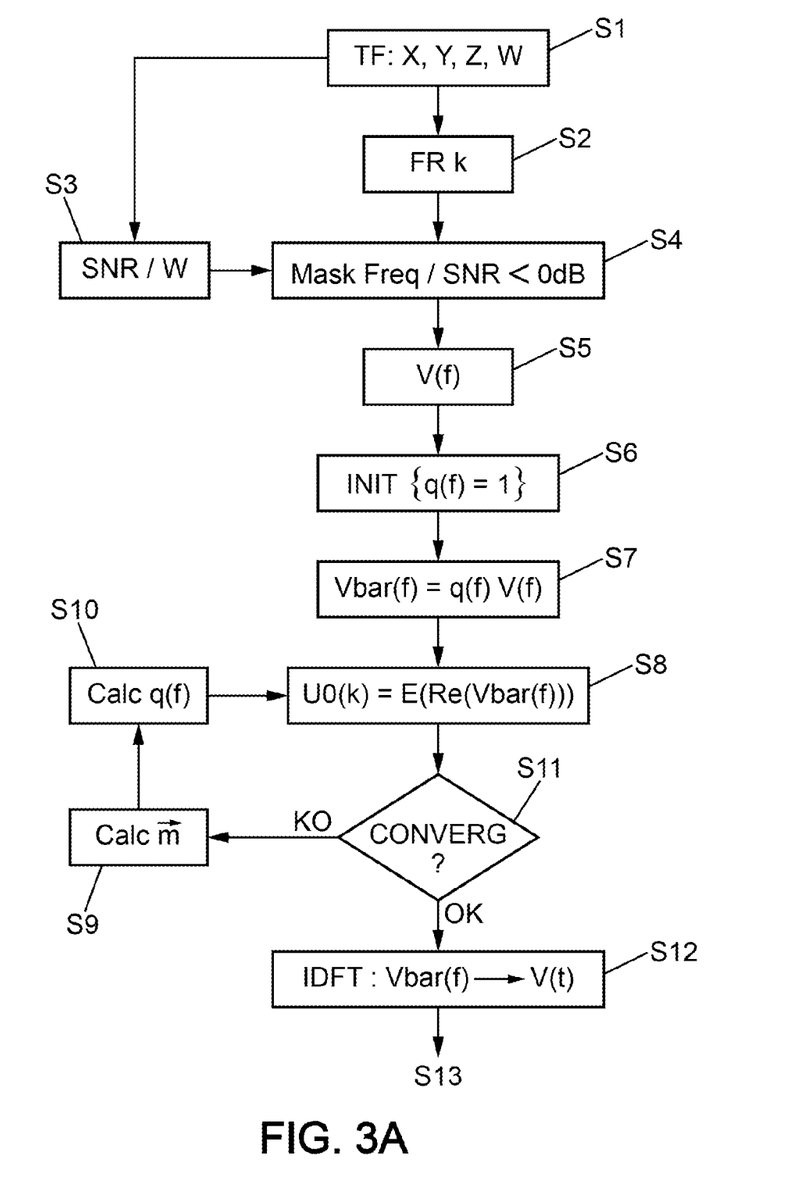
FIG. 3A shows the starting steps of an algorithmic processing to determine the relevant parameters U0, d0, etc.
Figure 3B:
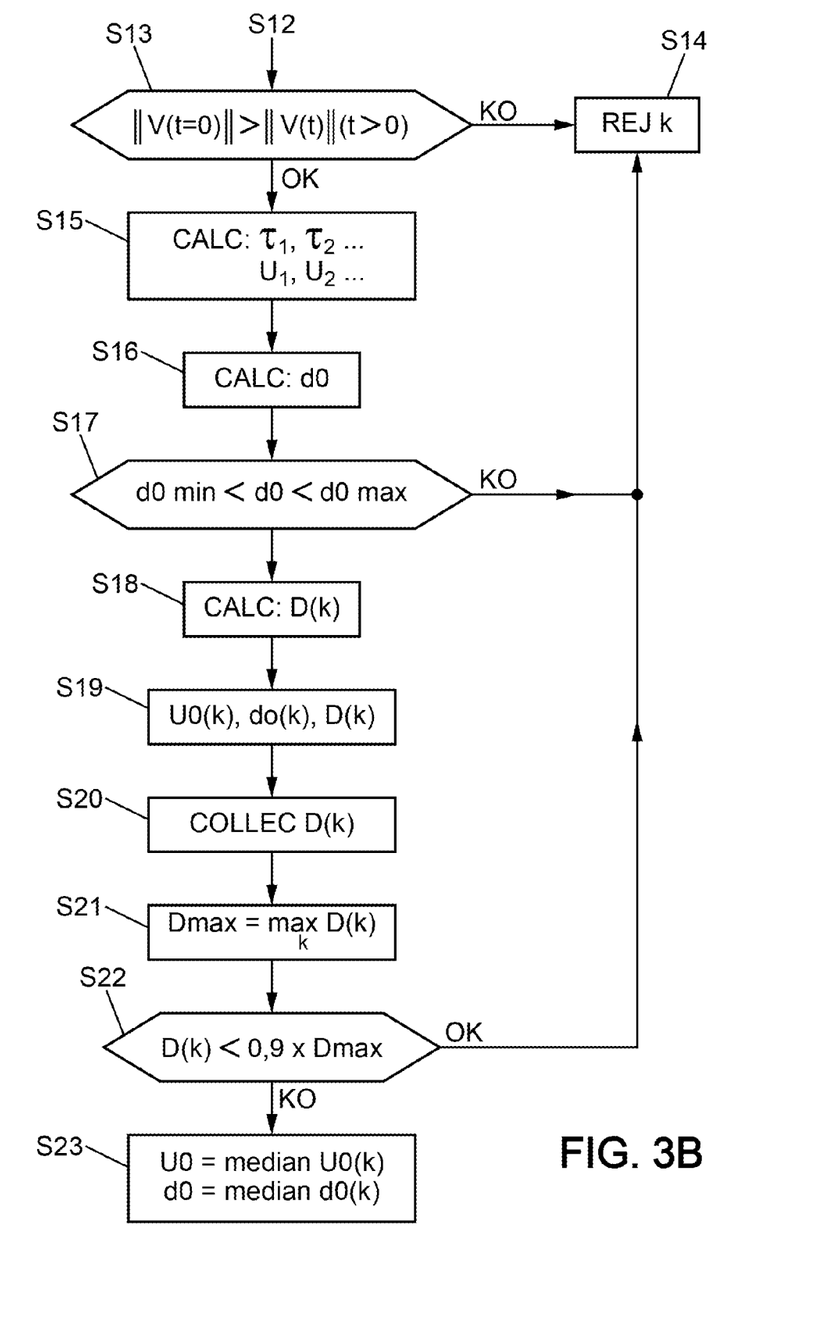
FIG. 3B shows the continuation of the processing steps of FIG. 3A.

FIGS. 3A and 3B illustrate a flowchart example of the algorithm of such a program.

In another aspect, there is provided a non-transitory, computer-readable recording medium on which such a program is recorded.

BRIEF DESCRIPTION OF THE DRAWINGS

Other characteristics, details and advantages will appear when reading the detailed description below, and analyzing the appended drawings, in which.

DETAILED DESCRIPTION OF ILLUSTRATIVE EMBODIMENTS

The velocity vector can be calculated in a manner known per se. However, some specific settings can be recommended to improve the final results obtained.

Usually, frequency spectra B(f) of Ambisonic signals are first typically obtained by Short Term Fourier Transform (or STFT) for a succession of temporal frames b(t), generally overlapping (with addition/overlaying for example). Here, the order of the Ambisonic components can be m=1 for four components (without loss of generality however, the calculations being able to adapt to higher orders).

Then, for each of the temporal frames, a velocity vector is then calculated for all the frequency samples as the ratio of the directional components X(f), Y(f) and Z(f) to the omnidirectional component W(f) (equation Eq. 6 in the APPENDIX). Embodiments also introducing temporal smoothing or consolidation by weighted sum, as described below, can be taken into consideration.

With such a ratio (X(f)/W(f), Y(f)/W(f), Z(f)/W(f)), the characteristic of the source signal is substantially removed to highlight the characteristics of the acoustic channel, provided that the spectral composition of the audio signal excites a substantial amount of useful frequencies (for example over a wide frequency band).

In the applications previously presented, one can consider the situation of an acoustic source with stable characteristics (in position and in radiation, at least over a few consecutive frames) emitting a signal s(t), in a stable acoustic environment (reflective, possibly diffracting, walls and objects, etc., and thus responsible for what is usually referred to as the "room effect" even if one may be outside a "room"). These signals are received by an ambisonic type microphone. Ambisonic signals b(t) result from the combined spatial encoding of different versions of the signal s(t) along its direct and indirect paths, the so-called "acoustic channel effect". This results in the convolution of the signal by a spatial impulse response h(t) of which each channel (or dimension) is associated with an ambisonic component, as expressed in equation Eq. 8 of the APPENDIX.

This impulse response is called SRIR for "Spatial Room Impulse Response" and is generally represented as a series of temporal peaks:
the first peak, located at time t=TAU0 (propagation time), corresponding to the direct sound,
the second peak, at t=TAU1 corresponds to a first reflection, etc.

Thus, it shall be possible to read in these peaks the direction from which these wavefronts originate, with as a first approximation the expression of the vector $u_n$ given in equation Eq. 9-1. In practice, the spatial impulse response is an unknown data, but it is exposed here how to go back indirectly to some of its characteristics, through the velocity vector, calculated on the basis of the ambisonic signal b(t).

To highlight this, the link between the impulse response h(t), the emitted signal s(t), and the ambisonic signals b(t) (Eq. 9-2) is first described over a chosen, observed time interval. To be exact, this expression assumes the absence of any measurement noise and of other acoustic sources whose signal would be directly or indirectly captured over the time interval taken into consideration. Thus, all of the direct and indirect source signal is captured over this time interval.

It is shown that by performing a Fourier Transform over this entire time interval, the resulting velocity vector is uniquely characteristic of the spatial impulse response. This so-called LT transform (because it is "longer term" than an STFT) converts b(t), s(t) and h(t) into B(f), S(f) and H(f) according to equation Eq. 10. This temporal support may correspond to a temporal window extending over several consecutive signal frames.

From the expression of the convolution in the frequency domain, that of the velocity vector, calculated with equation Eq. 11, is then deduced. This expression Eq. 11 becomes characteristic of the acoustic channel (in other words, of the room effect) and no longer of the transmitted signal, provided that the latter has a non-zero energy (in practice, detectable) for each frequency f, over the temporal period considered.

In practice and as has been mentioned, a frequent way is to carry out a time-frequency analysis per frame, where each Short-Term Fourier Transform is applied to a temporal windowing (in French: "fenêtrage") which does not a priori verify that the observed signal entirely and only results from a convolution product of equation Eq. 9. This means that, strictly speaking, the velocity vector cannot be written in a form which would only characterizes the acoustic channel (like the right part of equation Eq. 11). However, it is here approximated as much as possible (equation Eq. 20 detailed later) in the context of this description, while exploiting the advantages of the short-term analysis presented below.

At later stages a succession of energy peaks is searched for, which characterize on the one hand the direct path of the signal emitted from the source and received by the microphone, then the first reflections on one or more walls, as long as these reflections are identifiable. It can then be focused on what is characteristic of the beginning of the spatial impulse response, namely firstly the first temporal peak, from which we deduce the direction of the direct sound, and possibly the following temporal peaks, characteristic of the first reflections.

To this end, the effect of an interference between the direct sound and at least one reflection on the expression of the complex velocity vector is inspected so as to estimate relevant parameters for defining the position of the sound source.

A simplified model of a direct path (n=0) combined with N specular reflections (n=1, . . . , N) is introduced for the onset of the impulse response as presented in Eq. 12, wherein $g_n$, $TAU_n$, and $u_n$, are respectively the attenuation, the delay and the direction of origin of the wave of index n (n-th reflection) reaching the microphone system. In the following, for the sake of simplification but without restriction of generality, delays and attenuation relating to the direct sound are taken into consideration, which amounts to setting the terms of the equation Eq. 13 for n=0.

The corresponding frequency expression is given in equation Eq. 14, with the particular case of $gamma_0=1$ for the direct sound. Of course, the variable gammas, whatever n greater than 0, is a function of the frequency f.

The frequency expression of the ambisonic field follows, if the later part is neglected, given by the expression Eq. 16.

The short-term velocity vector is then expressed by equation Eq. 17, or even by equation Eq. 18 according to a regularized version with a non-zero EPSILON term so as to avoid (quasi) infinite values when W is (almost) zero.

The short-term analysis makes it possible to observe, over time and according to the dynamic evolution of the source signal, frequency footprints (denoted "FDVV" below), characteristic of submixes of wavefronts within the spatial impulse response. A characteristic submix (smx for "submix"), for a given observation, is modeled according to Eq. 19, in the temporal and frequency domains.

In the approach described hereinafter, one endeavors to characterize the frequency footprint FDVV as resulting from an implicit sub-mix model $H^{smx}$ by the approximation expressed in Eq. 20 (which is in general not an exact equality except in special situations).

Particularly at signal onset times, the implicit model $h^{smx}$(t) plausibly resembles the beginning of the $h^{early}$(t) spatial impulse response at least in terms of relative wavefront directions and delays. As the relative gain $g_n$ implicit parameters are impacted by the temporal windowing and the dynamic characteristics of the signal, they do not necessarily appear to conform to those of the impulse response. Focusing here primarily on the direct wave (which provides the DoA) and on one or a few early reflections, the situations where the observation is characteristic thereof is essentially considered.

For illustrative purposes in particular, an example of processing taking into account only a single reflection with an estimation in the frequency domain is described hereinafter. It is dealt here with the case of a simple interference (essentially between the direct sound and a first reflection), and it is shown how to determine the parameters sought by highlighting a particular spatio-frequency structure, by looking not only at the real part but also at the imaginary part of the velocity vector. Indeed, the ambisonic field is described according to Eq. 21, and the velocity vector is deduced therefrom according to Eq. 22. It follows from this expression that the real and imaginary parts travel parallel segments in 3D space (respectively affine and linear) when the frequencies travel the considered audio spectrum as presented in Eq. 23. The affine segment (real part) is on a line containing the unit vectors U0 and U1 pointing to the direct and indirect waves respectively, and the two segments are orthogonal to the median plane of these two vectors (and thus the imaginary part of the vector is itself always so since it is on the linear segment). Furthermore, assuming a homogeneous distribution of the phase shifts between the waves (therefore a representative sweep of the frequencies), according to a calculation of statistics, the average of the real part of the velocity vector is equal to the vector U0 as expressed in Eq. 24 and the maximum probability is an average of U0 and U1 weighted by the respective amplitude of the waves as expressed in Eq. 25. DoA detections based on a maximum probability are therefore tainted by a systematic angular bias, giving an intermediate direction between the direct sound and the direction thereof. The equations Eq. 23 show that this spatial scanning is done with a frequency periodicity equal to the inverse of the delay TAU1 between the two waves. It is therefore possible to extract the directions U0 and U1 as well as the delay TAU1 from the observations, when such spatio-frequency structures can be observed. Another embodiment for estimating these parameters in the temporal domain is presented below (description in connection with FIG. 2).

By having an a priori on the orientation of the reflection surface with respect to the reference frame of the microphone, one can then deduce from the estimate of U0, U1, TAU1, the absolute distance d information of the source with respect to the microphone, and possibly the height of both. Indeed, by noting d0 the distance from the source S0 to the microphone M, and d1 that of its mirror image S1 with respect to the reflection surface R as illustrated in FIG. 1, the surface R is orthogonal to the plane formed by the vectors U0 and U1. The three points (M, S0, S1) are in the same plane orthogonal to the surface R. There is a need to then define a parameter to be determined to define the orientation (or inclination) of the reflection plane. In the case of a reflection by the floor or the ceiling (detected thus because U1 points towards the floor or the ceiling), one can exploit the assumption that this one is horizontal and parallel to the plane X-Y of the frame of the ambisonic microphone. Then the distances d0 and d1 are linked by the relation Eq. 26, which moreover directly gives the distance from the microphone M to the axis (S0, S1), PHI0 and PHI1 being the respective elevation angles of the vectors U0 and U1.

An estimate of the delay TAU1 of the reflected sound relative to the direct sound is also obtained, which allows access to another relationship Eq. 27 between the distances, since their difference translates the acoustic path delay, with a factor c which is the speed of sound.

By expressing d1 as a function of d0, this last quantity becomes the only unknown one, which can be estimated according to Eq. 28. The distance from the source to the plane of reflection is also obtained, that is to say its height or altitude z0 with respect to the ground according to Eq. 29, as well as that of the microphone in Eq. 30.

The various parameters U0, U1, PHI0, PHI1, d1, d0, etc. are illustrated in FIG. 1 in the example of a reflection on a floor. Of course, similar parameters can be deduced for a reflection on a ceiling. In the same way, similar parameters can be deduced for a reflection on any other reflection surface R whose orientation with respect to the reference frame of the microphone is known, an orientation which is characterized by the normal $n_R$ (unit vector orthogonal to the surface R). It suffices to redefine the angles PHI0 and PHI1 with respect to the reflecting surface R, generally as PHI0=arcsin(U0·$n_R$) and PHI1=arcsin(U1·$n_R$). It is thus possible to determine by the vector U1 associated with each case of reflection the respective positions of these obstacles, for applications of augmented reality or in robotics for a localization estimation by acoustic detection.

In the cases where the orientation $n_R$ of the reflection surface is not a priori known, it is possible to estimate it completely if one has, by observations at different times, estimates of the wavefront parameters associated with at least two source positions, for which a reflection is detected by this same reflection plane. There is thus a first set of parameters (U0, U1, TAU1) and at least a second one (U0', U1', TAU1'). As U0 and U1 define a plane orthogonal to the plane R, their vector product defines an axis of this plane R, and the same applies to a vector product taken from U0' and U'1.

These respective vector products (non-collinear) define together the orientation of the plane R.

However, a limitation of the model to only two interfering waves (a direct sound and a reflected wave) is however that it can be difficult to discriminate the different first reflections on the partitions. Moreover, the spatio-frequency behavior of the velocity vector quickly becomes more complex when additional reflections are introduced. Indeed, the course of the real and imaginary parts then combine, and in a non-trivial way, along several axes:

in parallel planes for a direct wave and two reflections,
or in the whole space in general.

These complex spatio-frequency distributions make it too tedious to determine the model parameters when several reflection surfaces are to be considered.

A solution to this problem is to operate a time-frequency analysis that is more temporally selective (i.e., with shorter time windows) to have the chance of seeing simpler acoustic mixing appear during amplitude onsets (transients, signal rise), i.e., reduce the number of reflections interfering with the direct sound in the mix present in the relevant frame. However, in some situations, the delays associated with successive reflections may be too close one to another to isolate the effect of the first reflection in its interference from the direct sound.

A processing is then proposed hereinafter allowing to easily separate the effects of multiple interferences and to characterize them. A first step consists in converting the footprint (in French: "l'empreinte") of the velocity vector in the temporal domain (or "TDVV", for "Time-Domain Velocity Vector"), by means of an Inverse Fourier Transform as presented in Eq. 31. This has the effect of condensing the effects of frequency cyclicity associated with certain axes and which manifest themselves in complex wanderings of the velocity vector, in more sparing data and therefore more easily analyzable. Indeed, such a conversion causes series of peaks to appear at regular time intervals, peaks of which the most important ones are easily detectable and extractable (see for example FIG. 5B).

A remarkable property is that by construction (due to the inverse Fourier Transform) the vector at t=0 is equal to the average of the velocity vector in the frequency domain (average of its real part if we only consider the half-spectrum positive frequencies). Such an observation is relevant for the estimate of the main DoA U0.

Starting from the frequency model of the velocity vector for two interference waves (direct sound and one reflection), the denominator can usefully be reformulated thanks to the Taylor expansion in Eq. 32. With the conditions on x and gammal given in Eq. 32, the expression Eq. 33 of the velocity vector is obtained, and under the condition that the reflection is of lesser amplitude than the direct sound (g1<g0=1, which is generally the case for beginnings of sound onset), the inverse Fourier Transform of this expression converges and is formulated as expressed in equation Eq. 34, where a first peak is identified at t=0 which gives U0 (the direction of the direct sound), then a series of peaks characteristic of the interference of the reflection with the direct sound.

These peaks are placed at multiple times t=kTAU1 (non-zero integers k>0) of the delay TAU1, and are of exponentially decreasing amplitude in norm (according to the gain g1). They are all associated with directions collinear with the difference U0−U1, therefore orthogonal to the median plane between these two vectors, and with an alternating direction (sign). The advantage of having converted the velocity vector into the temporal domain is the sparing and almost immediate presentation of the parameters sought (FIG. 2).

Thus, it is possible to determine, in addition to the main DoA U0:
- the TAU1 delay, possibly for several distinct walls,
- then a vector collinear with U0−U1 which is normalized into a unit vector n, which can be used, with equation Eq. 41 for example, to
- deduce U1 as being the vector symmetrical to U0 with respect to their median plane, and
- optionally, the attenuation parameter g1 (this being likely to be modified by the time-frequency analysis parameters, in particular by the shape of an analysis window and by its temporal placement relative to the observed acoustic events. The estimation of this parameter is therefore of lesser utility in the application contexts referred to herein).

The observation of the following temporal peaks makes it possible to check whether they are substantially in conformity with the same series (multiple delays TAU1, multiple delays TAU2, etc.) and therefore characteristic of the same interference, otherwise it is necessary for example to determine the presence of multiple reflections.

Hereinafter, a case with "favorable conditions" is highlighted in which, in the case of N reflections, the Taylor expansion is applied to give the velocity vector according to Eq. 35, provided that the sum over N of the gammas in the equation Eq. 35 remains lower than 1. The Taylor series, which translates the denominator in the initial expression, can be rewritten using the multinomial law of equation Eq. 36, which makes it possible to reorganize the expression of the velocity vector V model as a sum of several series, with "cross series" represented by the term SC of Eq. 37.

Under the condition Eq. 38 for any frequency f, the following time series Eq. 39 is deduced by means of an inverse Fourier transform, with series with combined delays SARC. A first peak at t=0 which gives U0 (the direction of the direct sound) is identified, then for each reflection a series of peaks characteristic of the interference of this reflection with the direct sound. In FIG. 2 for example, these peaks are placed at successive positive temporal abscissas, TAU, 2TAU, 3TAU, etc., which are multiples of the delay TAU between the reflection on a wall and the direct path.

Characteristic series of interferences between several reflections on several walls and the direct sound then appear (for larger temporal abscissas), whose delays are other combinations (with positive integer factors) of their different delays.

Indeed, FIG. 2 illustrates such a series in the simplified case of two reflections interfering with a direct sound. Each marker (respectively round, cross, diamond) indicates by its ordinate the contribution of vectors U0, U1, U2 (characteristics of the direct sound, of a first reflection and of a second reflection respectively) to the temporal footprint TDVV as a function of temporal abscissas. It can thus be seen that the reception of the direct sound is characterized by the first peak at time zero and of amplitude 1, illustrated by a circle. The interference of a first reflection (delay TAU1) with the direct path causes a first series of peaks in TAU1, 2×TAU1, 3×TAU1, etc., which are marked herein by a cross at one end and a circle at the other end (up-down). The interference of a second reflection (TAU2 delay) with the direct path causes a second series of peaks in TAU2, 2×TAU2, 3×TAU2, etc., marked herein by a diamond at one end and a circle at the other end. Then comes an element of the "crossed series", that is to say the interference between the reflections (first delay: TAU1+TAU2, then 2TAU1+TAU2, then TAU1+2TAU2, etc.). These cross series, whose expression is accessible but long to write in a general case, are not explained herein for the sake of brevity, especially since they do not need to be exploited to estimate the relevant parameters in the processing presented herein.

The analysis of the temporal footprint by sequential estimation of the parameters is described hereinafter.

The estimation of the parameters of the model according to a calculated time series is done in a way similar to the previously described case of a single reflection. Firstly, in the most general situation (excluding particular cases dealt with later), corresponding to a favorable case when the delays do not "overlap": the series described above do not then display any temporal coincidence, that is, any identifiable peak belongs to only one of them. So, by noting the temporal peaks by increasing delay from t=0, any new peak detected, with a delay TAUnew, can either be attributed to a series already identified, or define the start of a new series. Indeed, taking into account a set of delays characteristic of reflections already identified, the first case is detected if there are positive integers k or partly null giving TAUnew according to Eq. 40, otherwise the second case applies and the set of identified reflections is increased by introducing the new delay TAUN+1, associated with a direction which can be estimated in the manner described in the case of a single reflection.

In practice, it may not be necessary to seek to explain many temporal spikes. Restriction is made to the first peaks observed, especially since they are the most easily detectable because of greater amplitudes (or magnitudes, in absolute value) than the following ones. Thus, situations where delays have common multiples but are of rank high (or non-low) Ki; Kj can be analyzed as a function of amplitude by the above processing.

As long as the sum of the implicit gain moduli gn (n>0) is lower than 1 (Eq. 38), the inverse Fourier Transform (Eq. 31) gives a unidirectional temporal footprint developing on positive times.

If, on the other hand, the sum of the implicit gain modules gn (n>0) is greater than 1, the inverse Fourier Transform gives a "bidirectional" TDVV temporal footprint, with series generally developing both towards positive times and negative times (top curve of FIG. 5B for illustration). Such a situation in which one or more reflection gains would be greater than 1 can be encountered for example when the direct wave is of lesser amplitude than the sum of the amplitudes of the waves resulting from the reflections on one or more partitions. In this "unfavorable case", the main peak at time zero does no longer strictly correspond to vector u0, but to a mixture of the latter with a more or less significant proportion of the vectors designating the directions of the reflections. This leads to a localization bias (of the 'estimated DoA'). Another symptom is that the main peak then has a norm which is different from 1 in general, and more often lower than 1. Depending on the relative importance of this problem, one can assess the extent to which the U0 vector offers a reasonable (weakly biased) DoA estimate, thus providing a confidence factor on the estimate and making it possible to preferentially select the estimate made on some frames. When the risk of estimation bias proves to be excessive, it is possible to select the frames least exposed to this problem, as described hereinafter with reference to FIG. 3 (composed by FIGS. 3A and 3B).

It is therefore possible to proceed to the observation of the first peaks for a given room by the frequency analysis of temporal subframes. The frames where signal onsets are localized (energy rise, transient, etc.) are those which make it possible to observe an acoustic mixture involving only the earliest wave fronts: the direct sound and one or more reflections (so that the aforementioned "sum of the gammas" remains lower than 1 according to Eq. 38).

With regard to frames containing the onsets of the signal, it is possible to adjust (possibly dynamically) the temporal window for the frequency analysis, for example by giving it an asymmetrical and globally decreasing shape, so that the "bump" of the window gives more weight to the signal rise (onset, transient) therefore to the direct sound, and progressively less weight (for example, but without obligation, in an approximately exponential way). Thus, the amplitude of the later wavefronts is artificially reduced with respect to the earlier wavefronts, and the convergence condition is approached, whereby the Taylor series ensures a unidirectional temporal development.

An example of decreasing exponential type temporal windowing is presented hereinafter, to be applied to the analyzed signal, in order to bring the analysis of the resulting temporal footprint back to a favorable case without substantial bias on the estimation of the arrival directions of the waves. The operation is set, valid from a time t0 designated as time 0 for convenience, and preferably corresponding to the instant of a signal onset, preceded by silence, as in equation Eq. 42, with ALPHA>0, and, by reintegrating the convolutional form involving s(t) and h(t), the form of equation Eq. 43 is found.

The equation Eq. 44 then brings into play the property of the exponential for which this choice is justified, so as to obtain the form given in Eq. 45, which amounts to establishing the equation Eq. 46.

So, if the impulse response is modeled by a set of specular reflections adding to the direct sound, the equation Eq. 47 is obtained.

Thus, if the sum of the gammas is greater than or equal to 1 (with a possibility of a "bidirectional series"), it is always possible to determine an attenuation factor ALPHA such that the sum of the gains thus "adapted" (Eq. 48) becomes lower than 1.

It is then observed that the temporal footprint is unidirectional in nature, which is evidenced by peaks only for positive times after application of the decreasing exponential window (lower part of FIG. 5B). It is also observed that in practice the energy of the observed signal decreases very quickly with the exponential, the numerical impact—on the estimates—of a truncation of the said signal becomes quite negligible beyond a relatively short truncation time. In other words, one obtains in the shorter term the advantages of a long-term analysis which encompasses both the entire exciter signal and the reverberation thereof. Indeed, the observed "TDVV" conforms to the interference model without the errors due to the dynamics of the signal. It is therefore a double property possessed by the weighting by such a window, which ideally makes it possible to obtain an exploitable temporal footprint.

In practice, not knowing in advance the amplitude of the reflections, it is suitable to determine the attenuation ALPHA, preferably seeking a compromise between a value low enough to ensure the unidirectionality of the temporal footprint and a value which is not too low to avoid reducing the chances of detecting and estimating the indirect waves. For example, this value can be determined in terms of attenuation factor $a_{EXP}$ by a duration $t_{EXP}$ which is physically representative of the observed phenomena (typically 5 ms) so that ALPHA=$-(\log a_{EXP})/t_{EXP}$ An iterative process (e.g., by dichotomy) can be implemented to adjust the attenuation value. From a threshold attenuation value, when the temporal footprint obtained is detected as being bidirectional, therefore a priori with a biased vector U0, the analysis is repeated with a stronger attenuation, otherwise at least the estimate of U0 is adopted and if the following peaks are little discernible (because they are reduced with the attenuation) then the analysis is repeated with an intermediate attenuation between the two previous ones, and so on if needed until the vector U1 can be estimated.

Nevertheless, the approach with an exponentially decreasing window can be sensitive to disturbances, in particular at the beginning of the windowing where they are significantly amplified. A disturbance other than noise may simply be the reverberation of the source itself at the beginning of the windowing if it was activated shortly before. It is then possible to introduce denoising processing to reduce such disturbances.

Provision can generally be made for temporal windows of different shapes and/or sizes, or even an overlap between windows with an overlay in order to maximize the chances of obtaining a "favorable footprint".

An initial DFT size is chosen which is generally larger than this analysis window.

Of course, we place ourselves in the context of processing digital audio signals, sampled at a given sampling frequency, in the form of successive blocks (or "frames") of samples.

It is also possible to optionally provide pre-processing with detection of onsets, transients, etc., then with time-frequency denoising, for example by defining a mask (time-frequency filter, possibly a binary one), so as to avoid introducing elements from other ambient and/or diffuse field sources into the interference footprint. It is suitable to calculate the impulse response of the mask (result of the inverse transform) to control the influence of the mask on the analysis of the peaks. It can alternatively be integrated into a frequency weighting of the footprint of a frame considered that needs to be stored, so as to subsequently calculate a weighted average of frequency footprints a priori corresponding to similar interfering mixes (typically on signal onsets, by checking that the relevant source has not moved, which can be guessed through an estimation of the delays).

Thus, it is then proceeded to extracting and observing the peaks, for example according to the norm |V(t)|: a maximum peak, then the next one, give TAU1 (in general), etc.

It is then proceeded to the diagnosis of the temporal footprint, by detecting (according to {tau_n} and V(sum (k_n·tau_n))):
  whether there is a temporal re-looping (a kind of circular "aliasing") due to the choice of an FFT on a too short temporal support,
  whether there is a progressive unidirectional series, or on the contrary a bidirectional series,
or even whether there is a particular case of a series without notable attenuation (when the sum of the gains sum(gn) remains close to 1) or even of a retrograde series (when at least one implicit gain g_n>1).

One can then:
  assign a score of "good frame" or "good footprint" (allowing a reliable estimate, a priori without bias of DoA, because it is unidirectional), and memorize it,
  carry out estimate (u_n) and
  adjust the analysis upstream if necessary by choosing an appropriate temporal window.

An analysis of the temporal footprint has been described above, but a frequency analysis can be carried out more simply as follows.

It is easy to mathematically show that the peak at time zero is by construction equal to the average of the velocity vector over its complete spectrum (the real part canceling out by Hermitian symmetry), or even its real part if only the positive frequencies are taken into consideration. It can be estimated that it is then useless to calculate an inverse Transform of the FDVV to have an estimate of DoA if only the direct sound is of interest. The temporal examination of the TDVV, however, makes it possible to detect whether this DoA is reliable (development criterion towards positive and increasing times).

This favorable case is more plausibly observed during onsets on the source signal, when the mixture is still not very complex. In general, it suffices to operate the estimate on these moments.

Moreover, in practice, the frequency and temporal footprints of the VV are not always identifiable with an ideal model of a mix of interfering waves. It may be that the source signal does not sufficiently or not always excite a significant range of frequencies at key moments, due to a lack of transmitted power, possibly taking into account competition from other components of the captured sound field (insufficient SNR or SIR). This can be linked to a more or less diffuse background sound (other sound sources), or a microphonic noise.

One can then perform at least one of these processing operations or several of these in combination:
  selecting time-frequency samples with onset detection according to advanced algorithms,
  smoothing the velocity vector over several frames (average of V(f) weighted for example by the $|W(f)|^2$ of the concerned frames and a forgetting factor which can be a dynamic one), possibly via the intensity vector, carrying out an average of V(f) weighted by $|W(f)|^2$ onto a selection of onset frames (if the extracted delays are identical), to complete the frequency footprint and consolidate the temporal footprint.

In order to simplify calculations, it can also be recommended to carry out the calculations of TDVV, or even, upstream, of FDVV, only for frames which are detected as being more consistent in terms of information: for example the onset frames if the situation is such that they are detectable by simple processing, in which case it is even advantageous to position the analysis window on the rise of the signal.

In order to estimate properly non-integer delays (fractional delay and multiples thereof in the time series), one can consider a peak estimation by inter-sample interpolation and/or a local frequency analysis (by isolating the peak over a temporally narrow vicinity) and fine-tune the delay based on the phase response.

It is possible to perform a prior selection of temporal peaks according to a current estimate of the characteristic delays of the series.

Thus, it is possible to summarize the steps implemented in an exemplary possible embodiment as illustrated in FIGS. 3A and 3B. At step S1, the Fourier transform (from time to frequency) of the Ambisonic signals is calculated, which may be in the form of a succession of "frames" (blocks of successive samples). For each transformed frame k (step S2), a dynamic mask can be applied to some of the frequency bands for which the signal to noise ratio is below a threshold (some frequency bands can indeed be highly noised, for example by a noise inherent to the microphone or other, so that the exploitation of a signal captured in this frequency band is compromised). In particular, searching noise per frequency band is carried out at step S3 preferentially on the "omni" component W, and the frequency bands altered by the noise (beyond a threshold such as for example SNR<0 dB) are masked (i.e., set to zero) at step S4.

Then, at step S5, the velocity vector V(f) is calculated in the frequency domain, for example by equation Eq. 6 (or even in the form of Eq. 11, Eq. 18 or Eq. 20).

In an exemplary embodiment, weights q(f) calculated as described hereinafter are applied to give more or less importance to frequency bands f. Such an embodiment makes it possible to express the velocity vector V(f) in frequency bands where its evolution is significant. To this end, the optimum weights are iteratively calculated as a function of U0 and V(f). Thus, returning to the algorithmic processing of FIG. 3A, at step S6, the various weights q(f) are set to 1. At step S7, the weighting q(f) applied to V(f) per band is applied, so that Vbar(f)=q(f)V(f). At step S8, U0 is determined for each frame k, such that:

$$U0(k) = E(Re(Vbar(f))),$$

where E(x) is here by way of example the expectation of x, which is thus similar to an average over all the frequencies of the real part of the estimated velocity vector Vbar(f).

Of course, this first estimate of U0(k) is rough. It is iteratively refined by calculating the weights with respect to the previous determination of U0(k) using the equation Eq. 49 based on the imaginary part of the vector V(f), and where the vector m is a unit vector, normal to the plane defined by the vector U0 and a normal to the wall (the direction z of FIG. 1 for example). The vector m is iteratively estimated also as a function of U0 at step S9, then the weights are calculated by Eq. 49 at step S10. The weights found are applied at step S7, and the estimation of U0 is refined until convergence at the output of the test S11. At this stage, U0(k) has been estimated for the different frames.

U1 can be deduced therefrom, by a relation of the Eq. 41 type described above. In the variant described here, U1 is determined by the equations Eq. 50 to Eq. 52, having previously applied an inverse transform IDFT (from frequency to time) at step S12 to the vector Vbar(f) found at step S7, to obtain a temporal representation V(t) of the velocity vector. Such an embodiment makes it possible, as seen above with reference to FIG. 2, to identify the various delays TAU1, TAU2, etc. in case of different reflective surfaces. The first delay TAU1 is identified because it is a first peak of V(t) in the time following the reception instant of the direct path. Thus, in equation Eq. 51, tmax(k) is the instant which maximizes the modulus of V(t)k calculated for frame k.

In the test S13, it is verified for each frame that the modulus of V(t=0) is much greater than that of V(t) for t>0. A frame not satisfying this condition is discarded at step S14. The different delays, TAU1, then TAU2 are then determined at step S15 (by removing modules from V(t)k, as compared in Eq. 51 with those corresponding to the delay TAU1), etc. The delay TAUm is given by the component tmax found at each iteration m, divided by the sampling frequency fs according to Eq. 52, taking into account that the times t and tmax(k) are first expressed in terms of sample index (time zero being taken as a reference for the zero index). The vectors U1, U2, etc., can then also be calculated with the equation Eq. 50.

The other parameters can also be determined, in particular d0 given by Eq. 28 at step S16 (by then checking in the test S17 a consistency with conventional room data such as d0 min=0, and d0 max=5 m; otherwise, the frame comprises an error and can be rejected at step S14).

Step S18 may consist in further selecting the "good" frames, representative of a sound onset with first reflections. The criterion D(k) for selecting such frames can be illustrated by way of example by equation Eq. 53 wherein $C(f)_i^{(k)}$ designates a magnitude (amplitude in absolute value) detected on the ambisonic channel i, at the time-frequency sample (t, f) resulting from the first transform (time to frequency) of frame k. Epsilon designates a nonzero positive value to avoid a zero in the denominator in the absence of a signal. F designates the total number of frequency subbands used.

It is thus possible to select at step S22 only the frames whose criterion D(k) calculated from Eq. 53 is not smaller than 90% of the maximum Dmax found at step S21 among the criteria of all the frames D(k).

Thus, at step S18, the values D(k) are calculated for all the frames, then at step S19, the processing delivers the U0(k), d0(k), D(k) for the different frames. At step S20, the values D(k) are collected to identify at step S21 the highest and to eliminate at step S22 the frames whose value D(k) is less than 0.9 Dmax.

Finally, at step S23, the vector U0 which is selected is preferably here the median (rather than the mean) one among the vectors U0 of the various selected frames. The distance d0 selected is also the median value among the distances d0 of the various selected frames.

Of course, the present invention is not limited to the embodiments described above by way of example; it extends to other variants.

An application to a processing of ambisonic signals of order 1 (FOA) has been described above. The order may be higher for an enrichment in terms of spatial resolution.

Indeed, an ambisonic representation of order 1 has been described above, but it is possible to provide higher orders. In this case, the velocity vector calculation is increased by the ratios of the directional components of higher orders on the component W(f), and the vectors Un are implicitly increased by as many dimensions. Increasing the dimensions (beyond 3), and therefore the spatial resolution, makes it possible to better differentiate the vectors U0, U1, . . . Un from each other, and to detect more easily, in the temporal footprint, the peaks V(k*TAUn) which are proportional to (U0-Un), even when the vectors U0 and Un are angularly close, which happens in the case of grazing reflections (when the source is distant and/or close to the ground for example). This therefore makes it possible to more finely estimate the sought parameters U0, U1, d0, etc.

More generally, it is possible to replace the velocity vector by a ratio between components of a spatial acoustic representation of the "coincident" type in the frequency domain and to work in a coordinate system characteristic of said spatial representation.

To overcome the cases e.g., with several sources, the calculation of TDVV can be exploited more generally in association with Artificial Intelligence methods, including neural networks. Some training strategies envisaged (for example on footprints from models or windowed SRIR, and not necessarily from original signals) can allow the network to learn to exploit the succession of frames to improve detections and estimates compared to given room situations.

ANNEX $$b(t) = \begin{bmatrix} w(t) \\ x(t) \\ y(t) \\ z(t) \end{bmatrix} \qquad \text{Eq. 1}$$

$$b(t) = s_1(t) \begin{bmatrix} 1 \\ x_{\vec{u}_1} \\ y_{\vec{u}_1} \\ z_{\vec{u}_1} \end{bmatrix} = s_1(t) \begin{bmatrix} 1 \\ \vec{u}_1 \end{bmatrix}, \vec{u}_1 = \begin{bmatrix} x_{\vec{u}_1} & y_{\vec{u}_1} & z_{\vec{u}_1} \end{bmatrix}^T \qquad \text{Eq. 2}$$

$$B(f) = \begin{bmatrix} W(f) \\ X(f) \\ Y(f) \\ Z(f) \end{bmatrix}; \qquad \text{Eq. 3}$$

$$B(f) = S_1(f) \begin{bmatrix} 1 \\ \vec{u}_1 \end{bmatrix} \qquad \text{Eq. 4}$$

$$\{\vec{u}_n, S_n(f)\}_{n=1,\ldots N} : B(f) = \sum_{n=1}^{N} S_n(f) \begin{bmatrix} 1 \\ \vec{u}_n \end{bmatrix} \qquad \text{Eq. 5}$$

$$\vec{V}(f) = \frac{1}{W(f)} \begin{bmatrix} X(f) \\ Y(f) \\ Z(f) \end{bmatrix} \qquad \text{Eq. 6}$$

$$\vec{I}(f) = W^*(f) \begin{bmatrix} X(f) \\ Y(f) \\ Z(f) \end{bmatrix}; \vec{V}(f) = \frac{1}{|W(f)|^2} \vec{I}(f) \qquad \text{Eq. 7}$$

$$h(t) = \begin{bmatrix} h_W(t) \\ h_X(t) \\ h_Y(t) \\ h_Z(t) \end{bmatrix} \qquad \text{Eq. 8}$$

$$\vec{u}_n = [h_X(\tau_n) h_Y(\tau_n) h_Z(\tau_n)]/h_W(\tau_n) \qquad \text{Eq. 9-1}$$

$$b(t) = s(t) * h(t) = \begin{bmatrix} s(t) * h_W(t) \\ s(t) * h_X(t) \\ s(t) * h_Y(t) \\ s(t) * h_Z(t) \end{bmatrix} \qquad \text{Eq. 9-2}$$

$$B^{LT}(f) = \mathcal{F}[b(t)](f) = \begin{bmatrix} W^{LT}(f) \\ X^{LT}(f) \\ Y^{LT}(f) \\ Z^{LT}(f) \end{bmatrix};$$ Eq. 10

$$H^{LT}(f) = \begin{bmatrix} H_W^{LT}(f) \\ H_X^{LT}(f) \\ H_Y^{LT}(f) \\ H_Z^{LT}(f) \end{bmatrix}; B^{LT}(f) = S^{LT}(f).H^{LT}(f)$$

$$\vec{V}^{LT}(f) = \frac{1}{W^{LT}(f)}\begin{bmatrix} X^{LT}(f) \\ Y^{LT}(f) \\ Z^{LT}(f) \end{bmatrix} = \frac{1}{H_W^{LT}(f)}\begin{bmatrix} H_X^{LT}(f) \\ H_Y^{LT}(f) \\ H_Z^{LT}(f) \end{bmatrix}$$ Eq. 11

$$h(t) = h_{early}(t) + h_{late}(t) = \sum_{n=0}^{N} g_n . \delta(t - \tau_n) . \begin{bmatrix} 1 \\ \vec{u}_n \end{bmatrix} + h_{late}(t)$$ Eq. 12

$$g_0 = 1; \tau_0 = 0$$ Eq. 13

$$H_{early}(f) = \sum_{n=0}^{N} g_n . e^{-j2\pi f \tau_n} . \begin{bmatrix} 1 \\ \vec{u}_n \end{bmatrix} = \sum_{n=0}^{N} \gamma_n(f) . \begin{bmatrix} 1 \\ \vec{u}_n \end{bmatrix};$$ Eq. 14

$$\gamma_n = \gamma_n(f) = g_n . e^{-j2\pi f \tau_n}$$

$$\gamma_0 = 1$$ Eq. 15

$$B(f) = S(f)\sum_{n=0}^{N} g_n . e^{-j2\pi f \tau_n} . \begin{bmatrix} 1 \\ \vec{u}_n \end{bmatrix} = S(f)\sum_{n=0}^{N} \gamma_n(f) . \begin{bmatrix} 1 \\ \vec{u}_n \end{bmatrix}$$ Eq. 16

$$\vec{V}^{ST}(T,f) = \frac{1}{W^{ST}(T,f)}\begin{bmatrix} X^{ST}(T,f) \\ Y^{ST}(T,f) \\ Z^{ST}(T,f) \end{bmatrix} = \frac{W^{ST}(T,f)^*}{|W^{ST}(T,f)|^2}\begin{bmatrix} X^{ST}(T,f) \\ Y^{ST}(T,f) \\ Z^{ST}(T,f) \end{bmatrix}$$ Eq. 17

$$\vec{V}^{ST}(T,f) = \frac{W^{ST}(T,f)^*}{|W^{ST}(T,f)|^2 + \epsilon}\begin{bmatrix} X^{ST}(T,f) \\ Y^{ST}(T,f) \\ Z^{ST}(T,f) \end{bmatrix}$$ Eq. 18

$$h^{smx}(t) = \sum_{n=0}^{N} g_n . \delta(t - \tau_n) . \begin{bmatrix} 1 \\ \vec{u}_n \end{bmatrix}; H^{smx}(f) = \sum_{n=0}^{N} g_n . e^{-j2\pi f \tau_n} . \begin{bmatrix} 1 \\ \vec{u}_n \end{bmatrix}$$ Eq. 19

$$\vec{V}^{ST}(T,f) \cong \vec{V}^{smx}(f) = \frac{1}{H_W^{smx}(f)}\begin{bmatrix} H_X^{smx}(f) \\ H_Y^{smx}(f) \\ H_Z^{smx}(f) \end{bmatrix}$$ Eq. 20

$$B(f) = S(f)\begin{bmatrix} 1 + \gamma_1(f) \\ \vec{u}_0 + \gamma_1(f)\vec{u}_1 \end{bmatrix}$$ Eq. 21

$$\vec{V}(f) = \vec{V} = \frac{\vec{u}_0 + \gamma_1 \vec{u}_1}{1 + \gamma_1}$$ Eq. 22

$$\mathfrak{R}(\vec{V}) = \frac{\vec{V} + \vec{V}^*}{2} = \frac{(\vec{u}_0 + \gamma_1 \vec{u}_1)(1 + \gamma_1^*) + (\vec{u}_0 + \gamma_1^* \vec{u}_1)(1 + \gamma_1)}{2|1 + \gamma_1|^2} =$$ Eq. 23

$$\vec{u}_0 + \frac{|\gamma_1|^2 + \mathfrak{R}(\gamma_1)}{|1 + \gamma_1|^2}(\vec{u}_1 - \vec{u}_0) = \vec{u}_0 + \frac{g_1^2 + g_1\cos(2\pi f \tau_1)}{1 + 2g_1\cos(2\pi f \tau_1) + g_1^2}(\vec{u}_1 - \vec{u}_0)$$

$$\mathfrak{I}(\vec{V}) = \frac{\vec{V} - \vec{V}^*}{2j} = \frac{\mathfrak{I}(\gamma_1)}{|1 + \gamma_1|^2}(\vec{u}_1 - \vec{u}_0) =$$

$$\frac{g_1 \sin(2\pi f \tau_1)}{1 + 2g_1\cos(2\pi f \tau_1) + g_1^2}(\vec{u}_1 - \vec{u}_0)$$

$$\mathfrak{R}(\vec{V}_{mean}) = \vec{u}_G;$$ Eq. 24

$$\vec{V}_{maxproba} = \frac{\vec{u}_0 + g_1 \vec{u}_1}{1 + g_1}$$ Eq. 25

$$d_0 \cos\varphi_0 = d_1 \cos\varphi_1$$ Eq. 26

$$d_1 - d_0 = \tau_1 c$$ Eq. 27

$$d_0 = \frac{\tau_1 c}{\frac{\cos\varphi_0}{\cos\varphi_1} - 1}$$ Eq. 28

$$z_0 = d_0 \frac{\sin\varphi_0 - \sin\varphi_1}{2};$$ Eq. 29

$$z_{mic} = z_0 - d_0 \sin\varphi_0$$ Eq. 30

$$\vec{V}(t) = \mathcal{F}^{-1}[\vec{V}(f)](t)$$ Eq. 31

$$\frac{1}{1-x} = 1 + x + x^2 + x^3 + \ldots = \sum_{k \geq 0} x^k; x = -\gamma_1; |\gamma_1| < 1$$ Eq. 32

$$\vec{V}(f) = (\vec{u}_0 + \gamma_1 \vec{u}_1)\sum_{k \geq 0}(-\gamma_1)^k =$$ Eq. 33

$$\vec{u}_0 + \sum_{k \geq 1}(-\gamma_1)^k(\vec{u}_0 - \vec{u}_1) = \vec{u}_0 + \sum_{k \geq 1}(-g_1)^k e^{-j2\pi f k \tau_1}(\vec{u}_0 - \vec{u}_1)$$

$$\vec{V}(t) = \delta(t)\vec{u}_0 + \sum_{k \geq 1}\delta(t - k\tau_1)(-g_1)^k(\vec{u}_0 - \vec{u}_1)$$ Eq. 34

$$\vec{V} = \frac{\vec{u}_0 + \sum_{n=1}^{N} \gamma_n \vec{u}_n}{1 + \sum_{n=1}^{N} \gamma_n} = \left(\vec{u}_0 + \sum_{n=1}^{N} \gamma_n \vec{u}_n\right)\sum_{k \geq 0}\left(\sum_{n=1}^{N} -\gamma_n\right)^k$$ Eq. 35

$$\sum_{k \geq 0}\left(\sum_{n=1}^{N} -\gamma_n\right)^k =$$ Eq. 36

$$\sum_{k_1, k_2, \ldots k_N \geq 0} \frac{(k_1 + k_2 + \ldots + k_N)!}{k_1! k_2! \ldots k_N!}\prod_{n=1}^{N}(-\gamma_n)^{k_n}$$

$$\vec{V} = \vec{u}_0 + \sum_{n=1}^{N}\left(\sum_{k \geq 1}(-\gamma_n)^k(\vec{u}_0 - \vec{u}_n)\right) + SC$$ Eq. 37

$$\left|\sum_{n=1}^{N}\gamma_n(f)\right| < 1; \sum_{n=1}^{N}|g_n| < 1$$ Eq. 38

$$\vec{V}(t) = \delta(t)\vec{u}_0 + \sum_{n=1}^{N}\left(\sum_{k \geq 1}\delta(t - k\tau_n)(-g_n)^k\right)(\vec{u}_0 - \vec{u}_n) + SARC$$ Eq. 39

$$\{k_n \geq 0\}_{n=1:N}; \tau_{new} = \sum_{n}^{N} k_n \tau_n; TAU N + 1 = \tau_{N+1} = \tau_{new}$$ Eq. 40

$$\vec{u}_1 = \vec{u}_0 - 2(\vec{u}_0 . \vec{n})\vec{n}$$ Eq. 41

$$\tilde{b}(t) = b(t) . e^{-\alpha t}$$ Eq. 42

$$\tilde{b}(t) = e^{-\alpha t}(s(t) * h(t)) = e^{-\alpha t}\int_{\tau \geq 0}^{\square} s(t - \tau)h(\tau)d\tau$$ Eq. 43

$$e^{-\alpha t} = e^{-\alpha(t-\tau)} . e^{-\alpha \tau}$$ Eq. 44

$$\tilde{b}(t) = \int_{\tau \geq 0}^{\square} s(t - \tau)e^{-\alpha(t-\tau)}.h(\tau)e^{-\alpha\tau}d\tau$$ Eq. 45

$$\tilde{b}(t) = \int_{\tau \geq 0}^{\square} \tilde{s}(t - \tau)\tilde{h}(\tau)d\tau = \tilde{s}(t) * \tilde{h}(t)\left(\tilde{s}(t) = s(t).e^{-\alpha t}; \tilde{h}(t) = h(t).e^{-\alpha t}\right)$$ Eq. 46

$$\tilde{h}(t) = \sum_{n=0}^{N} g_n . e^{-\alpha \tau_n} . \delta(t - \tau_n) . \begin{bmatrix} 1 \\ \vec{u}_n \end{bmatrix} =$$ Eq. 47

$$\sum_{n=0}^{N} \tilde{g}_n . \delta(t - \tau_n) . \begin{bmatrix} 1 \\ \vec{u}_n \end{bmatrix}(\tilde{g}_n = g_n . e^{-\alpha \tau_n} < g_n)$$

$$\sum_{n=1}^{N} |\tilde{g}_n| < 1.$$ Eq. 48

$$q(f) = \exp\left(-\frac{|\mathfrak{I}(\vec{V}(f)).m|}{\|\mathfrak{I}(\vec{V}(f))\|}\right)$$ Eq. 49

$$u_1 = u_0 - \frac{2u_0 . v_{max}(k)}{\|v_{max}(k)\|^2}v_{max}(k)$$ Eq. 50

$$t_{max}(k) = \text{argmax}_{t>0}\|V(t)_k\|$$ Eq. 51

$$\hat{\tau}_1 = \frac{t_{max}(k)}{f_s}$$ Eq. 52

$$D(k) = \max\left(0, \frac{1}{4F}\sum_{f=0}^{F-1} q(f)\sum_{i=0}^{3} \frac{C(f)_i^{(k-1)} - C(f)_1^{(k-1)}}{\max(C(f)_i^{(k+1)}, C(f)_i^{(k-1)}) + \epsilon}\right)$$ Eq. 53

$$D(k) \geq 0.9 \max_k D(k)$$

Although the present disclosure has been described with reference to one or more examples, workers skilled in the art will recognize that changes may be made in form and detail without departing from the scope of the disclosure and/or the appended claims.

The invention claimed is:

1. A method for processing sound signals acquired by at least one microphone, for localizing at least one sound source in a space comprising at least one wall, wherein the method is implemented by a processing device and comprises:
applying a time-frequency transform to the acquired signals; and
producing from the acquired signals, a velocity vector V(f), which is complex with a real part and an imaginary part and is expressed in the frequency domain, said velocity vector characterizes a composition between:
a first acoustic path, direct between the at least one sound source and the at least one microphone, represented by a first vector U0, and
at least one second acoustic path resulting from a reflection on the at least one wall and represented by a second vector U1,
said second path having, at the at least one microphone, a first delay TAU1, with respect to the direct path,
depending on the delay TAU1, on the first vector U0 and on the second vector U1, determining at least one parameter from among:
a direction of the direct path,
a distance d0 from the at least one sound source to the at least one microphone,
a distance z0 from the at least one sound source to said at least one wall.

2. The method according to claim 1, wherein the at least one microphone comprises an ambisonic type microphone and the velocity vector V(f) in the frequency domain is expressed by ambisonic components of order 1 in a form of the type:

$$V(f)=1/W(f)[X(f),Y(f),Z(f)]^T,$$

where X(f), Y(f), Z(f) are directional components and W(f) is an omnidirectional component.

3. The method according to claim 1, wherein the direction of the direct path is determined by the first vector U0 from an average over a set of frequencies of the real part of the velocity vector V(f) expressed in the frequency domain.

4. The method according to claim 1, comprising:
applying an inverse transform, from frequencies to time, to the velocity vector to express it in the temporal domain V(t),
determining at least a maximum in the expression of the velocity vector V(t)max as a function of time, after a duration of the direct path, and
deducing therefrom the first delay TAU1, corresponding to the time giving the maximum V(t)max.

5. The method according to claim 4, wherein:
the second vector U1 is estimated as a function of the first vector U0 and as a function of the maximum V(t)max, by a relation of the type:

$$U1=U0-2(U0\cdot V(t)\text{max})V(t)\text{max}/\|V(t)\text{max}\|^2.$$

6. The method according to claim 5, comprising:
determining respective angles PHI0 and PHI1 of the first vector U0 and of the second vector U1, with respect to said at least one wall, such that:

$$PHI0=\arcsin(U0\cdot n_R) \text{ and } PHI1=\arcsin(U1\cdot n_R),$$

where $n_R$ is a unit vector and normal to the at least one wall, and
determining the distance d0 between the at least one sound source and the at least one microphone is determined as a function of the first delay TAU1 by a relation of the type:

$$d0=(TAU1\times C)/((\cos PHI0/\cos PHI1)-1),$$

wherein C is the speed of sound.

7. The method according to claim 6, comprising determining the distance z0 from the at least one sound source to said at least one wall by a relation of the type:

$$z0=d0(\sin PHI0-\sin PHI1)/2.$$

8. The method according to claim 1, wherein the space comprises a plurality of walls and the method comprises:
applying an inverse transform, from frequencies to time, to the velocity vector to express it in the temporal domain V(t) in the form of a succession of peaks,
identifying in the succession of peaks, peaks linked to a reflection on a wall of said plurality of walls, each identified peak having a temporal abscissa as a function of a first delay TAUn of the acoustic path resulting from the reflection on the corresponding wall n, with respect to the direct path,
depending on each first delay TAUn, on the first vector U0 and on each second vector Un representing an acoustic path resulting from a reflection on a wall n, determining at least one parameter from among:
the direction of the direct path,
the distance d0 from at least one sound the source to the at least one microphone, and
at least a distance zn from the at least one sound source to the wall n.

9. The method according to claim 8, wherein the peaks linked to a reflection on a wall n have temporal abscissas that are multiples of the delay TAUn associated with this wall n.

10. The method according to claim 8, wherein a first part of peaks at the smallest positive temporal abscissas is pre-selected, in order to identify in said part the peaks each associated with a reflection on a wall.

11. The method according to claim 1, wherein the acquired signals are delivered in the form of successive frames of samples, and the method comprises:
estimating for each frame, a score for the presence of a sound onset in the frame, and
selecting the frames with scores higher than a threshold for the determination of said at least one parameter.

12. The method according to claim 1, wherein the signals acquired by the at least one microphone are in the form of a succession of samples, and the method comprises applying a weighting window to said samples with decreasing exponential variation over time.

13. The method according to claim 1, comprising iteratively applying a weighting q(f), each associated with a frequency band f, to the velocity vector V(f) in the frequency domain according to an expression of the type:

$$q(f)=\exp(-|Im(V(f))\cdot m|/(\|Im(V(f))\|)),$$

wherein Im(V(f)) is the imaginary part of the velocity vector, complex, and m is a unit vector normal to the plane defined by vector U0 and a normal to the wall.

14. A device for processing sound signals, comprising:
a processing circuit configured to implement a method for processing sound signals acquired by at least one microphone, for localizing at least one sound source in a space comprising at least one wall, by:

applying a time-frequency transform to the acquired signals; and producing from the acquired signals, a velocity vector V(f), which is complex with a real part and an imaginary part and is expressed in the frequency domain, said velocity vector characterizes a composition between:
- a first acoustic path, direct between the at least one sound source and the at least one microphone, represented by a first vector U0, and
- at least one second acoustic path resulting from a reflection on the at least one wall and represented by a second vector U1, said second path having, at the at least one microphone, a first delay TAU1, with respect to the direct path, depending on the delay TAU1, on the first vector U0 and on the second vector U1, determining at least one parameter from among:
- a direction of the direct path,
- a distance d0 from the at least one sound source to the at least one microphone,
- a distance z0 from the at least one sound source to said at least one wall.

15. A non-transitory computer readable medium, storing a computer program comprising instructions for implementing a method, when said instructions are executed by a processor of a processing circuit, for processing sound signals for localizing at least one sound source in a space comprising at least one wall, wherein the sound signals are acquired by at least one microphone, and the method comprises:

applying a time-frequency transform to the acquired signals; and producing from the acquired signals, a velocity vector V(f), which is complex with a real part and an imaginary part and is expressed in the frequency domain, said velocity vector characterizes a composition between:
- a first acoustic path, direct between the at least one sound source and the at least one microphone, represented by a first vector U0, and
- at least one second acoustic path resulting from a reflection on the at least one wall and represented by a second vector U1, said second path having, at the at least one microphone, a first delay TAU1, with respect to the direct path, depending on the delay TAU1, on the first vector U0 and on the second vector U1, determining at least one parameter from among:
- a direction of the direct path,
- a distance d0 from the at least one sound source to the at least one microphone,
- a distance z0 from the at least one sound source to said at least one wall.

* * * * *